No. 811,423. PATENTED JAN. 30, 1906.
C. A. MEYERS.
PRESS FOR MOLDING CEMENT OR PLASTIC BLOCKS.
APPLICATION FILED AUG. 11, 1905.
2 SHEETS—SHEET 2.
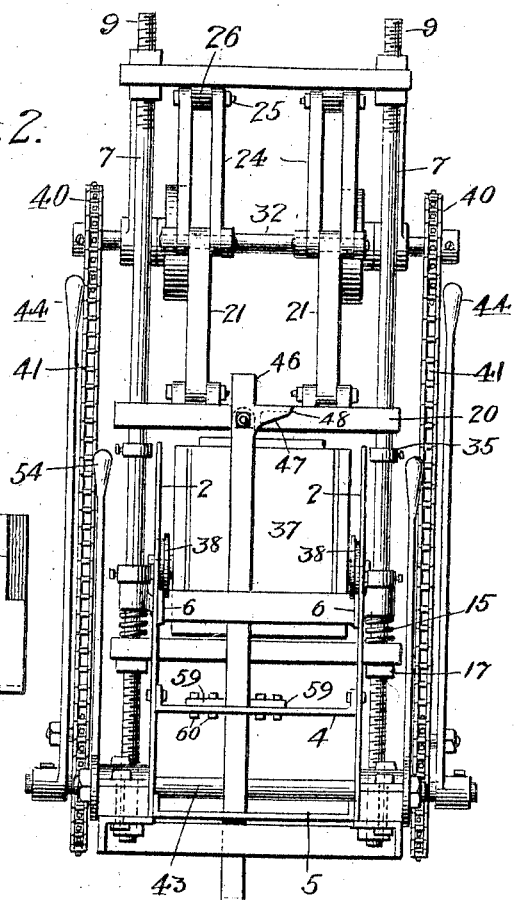
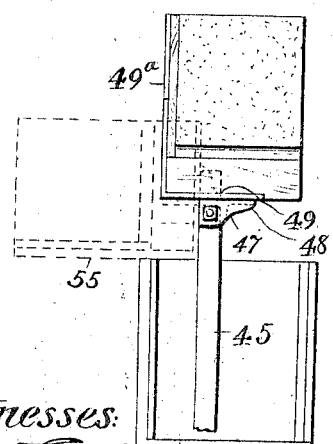
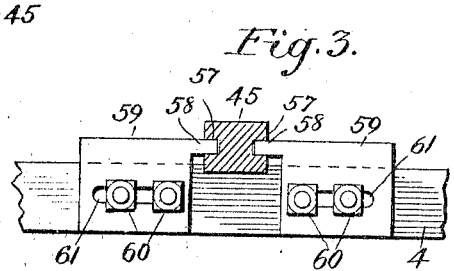
Witnesses:
Inventor:

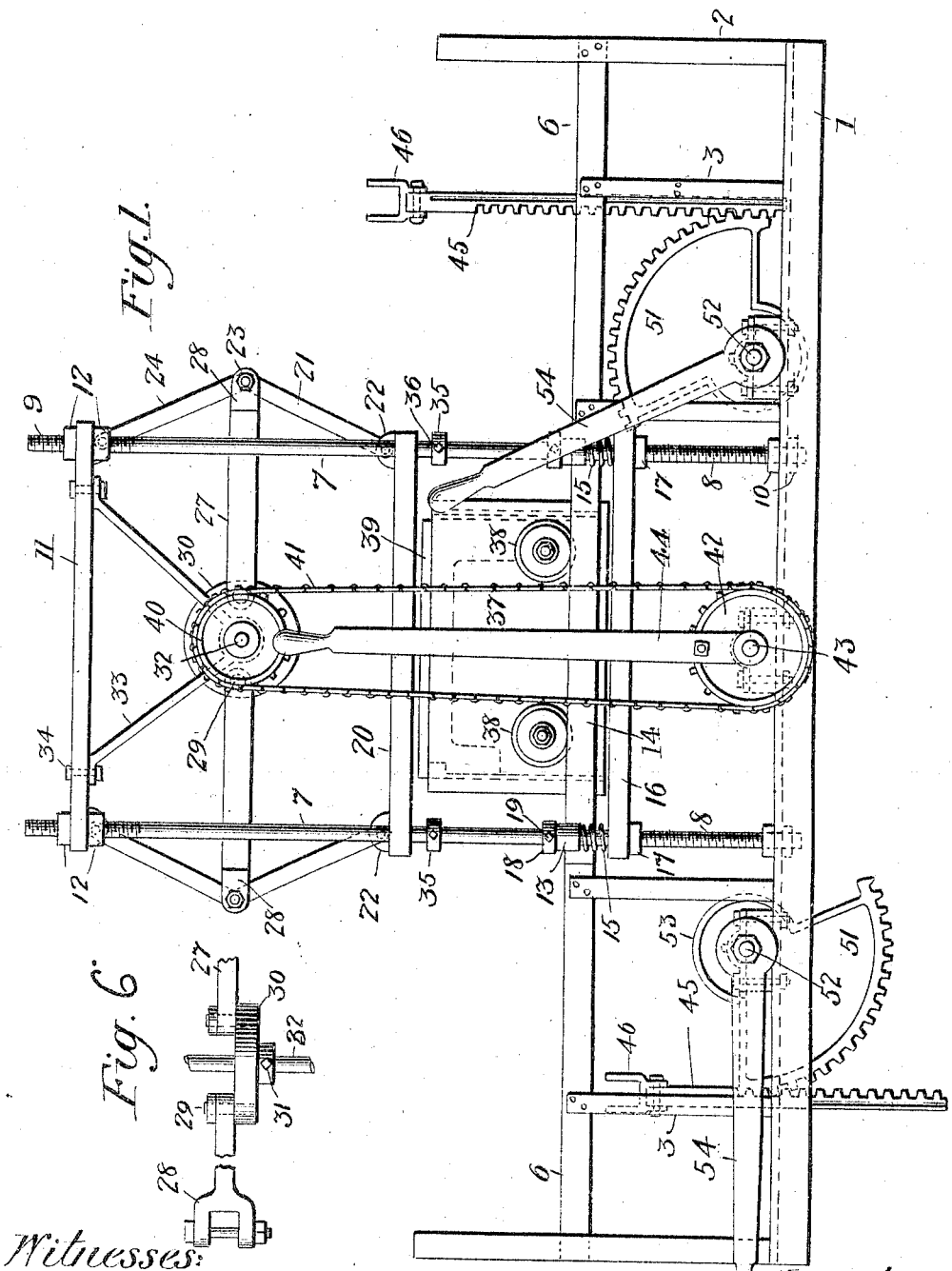

UNITED STATES PATENT OFFICE.

CHARLES ARTHUR MEYERS, OF LEIPSIC, OHIO.

PRESS FOR MOLDING CEMENT OR PLASTIC BLOCKS.

No. 811,423.　　　Specification of Letters Patent.　　　Patented Jan. 30, 1906.

Application filed August 11, 1905. Serial No. 273,816.

*To all whom it may concern:*

Be it known that I, CHARLES ARTHUR MEYERS, a citizen of the United States, residing at Leipsic, in the county of Putnam and State of Ohio, have invented certain new and useful Improvements in Presses for Molding Cement or Plastic Blocks; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to presses for forming blocks of concrete or plastic material; and it has for its object to construct such a press having toggle-levers applied so as to exert a downward pressure on the upper platen from the upper part of the press downwardly above the mold containing the cement or plastic block combined with cams for actuating said toggle-levers.

It has, further, for its object to combine with the upper platen a yielding support for the mold, so that there will be at the beginning a gradual compression of the plastic material within the mold.

It has, further, for its object to provide the press with means for lifting the cement block out of the mold after it has been formed.

It has, further, for its object to provide means for tilting and turning to one side the cement block after it has been molded and lifted from the mold.

It has, further, for its object to provide a frame for the press strong and compact in its structure and composed of few parts.

To the accomplishment of the foregoing and such other objects as may hereinafter appear the invention consists in features of construction and in combination of parts, hereinafter particularly described and then sought to be clearly defined by the claims, reference being had to the accompanying drawings, forming part hereof, and in which—

Figure 1 is a side elevation of the press; Fig. 2, an end elevation; Fig. 3, a detail plan showing the guides for the lifting rack-bar; Fig. 4, an elevation showing the molded block lifted and in position to be tilted; Fig. 5, an end view of the tilting shelf-plate and Fig. 6 a detail of the eccentric and pitmen which connect it to the toggle-lever.

The lower portion of the frame of the press consists of the longitudinal base-bars 1, preferably formed of angle-iron, the vertical end bars 2, and the intermediate vertical bars 3, the end and intermediate bars being provided at their lower ends with flanges by which they may be bolted to the longitudinal base-bars, the vertical bars being spaced apart and braced by any desired number of cross-bars 4 and 5, which will be formed with flanged ends, by which they may be bolted to the vertical or upright bars. This frame supports at each end tracks or rails 6, which are bolted to the upright bars 2 and 3, and they are so disposed in relation to each other that there will be left a space between the inner ends of one set of rails and the inner ends of the other set of rails, so that intermediate rails designed to support the mold may fit in said space so as to have a vertical movement or adjustment therein.

From the central portion of the base-frame of the press rise vertical rods 7, which are formed with threads 8 at their lower ends and with threads 9 at their upper ends. The lower ends of these rods pass through the flanges of the longitudinal bars 1 and are secured thereto by nuts 10, and the rods at their upper ends are connected together and braced by a frame or plate 11, through which the rods pass, the plate or frame and rods being held together by means of nuts 12, applied to the threaded ends of the rods above and below said plate or frame. The rods 7 are provided with sleeves 13, adapted to slide thereon and which carry the rails 14, which are in alinement with the rails or tracks 6. These sleeves 13 rest upon springs 15, which are coiled around the rods 7 and bear at their lower ends on the lower platen 16, through which the rods 7 pass and which is held at the position desired by means of nuts 17, applied to the threaded portions of the rods 7. The rails 14 are thus yieldingly or elastically supported. Collars 18, applied to the rods 7 and held thereto by set-screws 19, limit the upward movement of the tracks 14, so that when the tracks are in their normal position they will be in alinement with the tracks or rails 6. The tension of the springs 15 and the amount of vertical play to be allowed to the rails 14 during the operation of pressing the cement block will be regulated and controlled by the nuts 17, which hold the lower platen 16 to the rods 7.

The upper platen 20 slides upon the rods 7 and is actuated from the upper portion of the press-frame above the mold by means now to be described.

The numeral 21 designates links, which are pivotally connected at their lower ends to ears 22, formed on the platen 20, there being two of these links at the opposite ends of the platen. The upper ends of these links are connected by bolts 23 to the lower ends of links 24, which are arranged in pairs and pivotally connected at their upper ends by bolts 25 to lugs 26, which depend from the upper plate and brace-frame 11. The bolts 23 also connect the ends of pitmen 27 to the links 21 and 24. These pitmen 27 have forked ends 28, which span the jointed ends of the links 21 and 24 and cause the power to be applied at both sides of the joint between the links 21 and 24, and thus cause the pull of the pitmen on the links to be applied evenly at both sides of the joint, thus preventing cramping of the parts and rendering them more satisfactory in operation. The inner ends of the pitmen 27 are connected by pins or bolts 29 to the eccentric wheels 30, which are applied at opposite sides of the frame formed by the upright rods 7. These eccentric wheels 30 are secured by set-screws 31 or otherwise to a transverse shaft 32, journaled in the lower ends of yokes 33, hanging from the top plate or frame 11 and secured thereto by bolts 34. The inner ends of the pitmen 27 being secured to the eccentric wheels at opposite sides of the shaft 32, said shaft will prevent the inner ends of the pitmen from being carried around in a complete revolution, and consequently will to that extent limit the downward movement of the upper platen.

The numerals 35 designate collars mounted on the rods 7 below the upper platen 20 and held at the adjustment desired by means of set-screws 36, which collars will limit the downward movement of the platen 20 when the latter comes in contact therewith in lowering the platen during the operation of pressing the cement block.

The mold for the cement block is designated by the numeral 37, and it is provided at its sides with wheels 38, which rest upon the rails 14, and the numeral 39 designates the pressing-plate, which is placed on top of the cement in the mold and receives the direct pressure of the upper platen, so as to transmit it to the cement in the mold. The mold containing the cement is run onto the track 14 beneath the platen 20 and the toggle-levers actuated so as to force down the platen onto the presser-plate lying on top of the cement, so as to compress the latter. The springs 15 allow the track, as well as the mold supported on it, to yield when the pressure of the platen is first applied, so that the pressure is gradual, and when the bottom of the mold comes in contact with the lower platen 16 the downward movement is checked until the compression is completed. When the pressure is relieved, the springs 15 lift the track and mold to their normal position.

Power is applied to the shaft 32 and through it to the toggle-levers by means of a cog-wheel 40, connected to said shaft and a chain 41, which passes around a cog-wheel 42, secured to a shaft 43, operated by a hand-lever 44. It is preferred to have a cog-wheel 40 applied at each end of the shaft 32 and a cog-wheel 42 at each end of the shaft 43, and also to have a hand-lever 44 and a sprocket-chain 41 at each side of the machine, so that the press may be operated from either side. While I prefer this arrangement, yet it is obvious that a pulley driven by a power-belt might be substituted without departing from other features of the invention. After the block has been completed and the pressure of the platen relieved, the mold is moved from the track 14 onto the end track or rails 6 at one end of the machine or press, so that the completed block may be removed from the mold. For the purpose of removing the block from the mold I provide the following instrumentalities, which will be located at both ends of the press, and as the construction will be the same at each end a description of the parts at one end will be sufficient. The numeral 45 designates a vertically-movable rack-bar, which is provided at its upper end with a pivoted finger 46, preferably in the form of a fork and provided with a shoulder 47, said finger being so formed that it will have a projection 48 to bear against one side of the rack-bar and form a stop to hold the finger vertically and its shoulder horizontally when in their normal position, the finger being otherwise free to swing to the opposite side of the rack-bar in tilting and discharging the molded block from its mold. Inside of the mold at one side is placed an L-shaped metal plate 49ª, fitting against one side of the mold and having its bottom portion lying under the bottom board of the mold. The bottom portion of this plate is formed with an opening or openings 49, and the bottom board is formed with corresponding openings 50. The pivoted finger of the rack-bar enters these openings when the rack-bar is raised after the mold has been moved onto the end rails far enough to bring the mold against the upper portions of the end uprights of the press. The rack-bar is raised by means of a toothed segment 51, secured to a shaft 52, journaled in a suitable boxing 53 on the base of the frame, and a hand-lever 54 for operating the same. As the bar is thus raised the finger enters the openings in the metal plate and in the bottom board of the mold, with the shoulder of the finger bearing against the bottom of said board, and as the bar is elevated the cement block and core and pallet-boards in the mold are lifted to the top of the mold. When such parts are above the top of the mold, the pivoted finger turns and the block is tilted and turned over onto a pallet-board 55, placed at one side of the press to receive it, the L-shaped plate serving as a shelf for the molded block. This L-shaped plate or shelf has recesses 56 cut in its side edges at the top, so that the pallet-board lying next to it between the board and block may be grasped for the purpose of sliding the block from off the shelf and its supporting pallet-board. In practice the parts are proportioned so that the top of the mold will be about thirty inches from the base-bars of the press and the pallet-board to receive the block after it is turned out of the mold will be about the same height, and thus the block can be conveniently manipulated. After the block has been discharged from the mold and the rack-bar lowered to its normal position and the interior parts of the mold assembled the mold is again ready to be moved into position on the central track to have another block molded. In the meanwhile another mold may have been in position to have a block molded and moved onto the other end track to have the block moved from the mold by the duplicate instrumentalities at that end of the press. Under this construction the capacity of the press is doubled.
The parts comprising the frame of the press are preferably of wrought iron or steel and are strong and durable and easily assembled as well as easily taken apart for shipment or for setting up in another place. For the purpose of guiding the rack-bars 45 they have grooves 57 formed in opposite faces, into which extend tongues 58, projecting from plates 59, which are adjustably held to the spacing-bars 4 by bolts 60, passing through the plates and through slots 61 formed in said spacing-bars.

By having the top platen operated by the toggle-levers from above the parts are out of the way and free from dirt and the rod, and in applying the pressure the expenditure of less power is necessary because the top platen slides down on the guiding-rods, and the levers have merely to exert a downward pressure, as they do not have to expend part of their power in lifting any part of either platen in applying the pressure.

While the preferred construction and arrangement of the several parts have been described with particularity, yet it is to be understood that the invention is not confined to such details except where particularly so specified.

Having described my invention and set forth its merits, what I claim is—
1. In a press, upright rods, a platen slidable thereon, toggle-levers composed of links arranged in pairs at opposite ends of the platen and pivotally suspended from a support at the upper part of said rods and links pivotally connected to the platen and having their upper ends lying between the pairs of suspended links and jointed thereto, and pitmen connected to said links at their junction with each other for operating the same, substantially as described.
2. In a press, upright rods, a platen slidable thereon, toggle-levers pivotally connected at one end to the platen and at the other end to a support at the upper end of said rods, pitmen formed with a fork at one end and spanning the meeting ends of the toggle-levers and pivotally connected thereto, and eccentrics intermediate of and to which the inner ends of said pitmen are connected for actuating the toggle-levers, substantially as described.

3. In a press, a mold-supporting track, rods rising above the track, a platen sliding on the rods above the track, toggle-levers located at opposite sides of the platen and connected with the platen and with a support, pitmen connected with the toggle-levers, and eccentrics intermediate of and with which the inner ends of the pitmen are connected for operating the pitmen, substantially as described.

4. In a press, upright rods, a platen, levers for operating the platen, a mold-supporting track beneath the platen, sleeves slidable on the rods and having the track connected thereto, springs beneath said sleeves and means supporting said springs, substantially as described.

5. In a press, a platen, and a yieldingly-supported mold-sustaining track beneath the platen, substantially as described.

6. In a press, upright rods, sleeves mounted on said rods, a mold-sustaining track supported from said sleeves, springs forming a cushion for said sleeves, and means limiting the movement of the sleeves, substantially as described.

7. In a press, upright rods, a toggle-lever-actuated platen slidable on the rods, a mold-supporting track below said platen, sleeves slidable on the rods and having said track connected thereto, springs forming a cushion for said sleeve, and a fixed platen below said track, substantially as described.

8. In a press, the base-frame supporting end tracks, upright rods, sleeves slidably mounted on said rods, a mold-supporting track connected to said sleeves and located between the end tracks, springs sustaining said sleeves and intermediate track, a platen slidably mounted on the rods above said track, and levers for moving said platen, substantially as described.

9. In a press, a support for a mold, a lifting-bar for lifting the molded block out of the mold, and a tilting device connected to said bar for turning over the block as it leaves the mold, substantially as described.

10. In a press, a support for a mold, a lifting-bar for lifting the molded block out of the mold, and a finger pivoted to the bar and adapted to engage with a part of the mold in turning over the block as it leaves the mold, substantially as described.

11. In a press, a support for a mold, a lifting-bar for raising the molded block, a finger pivoted to the bar and adapted to engage a part of the mold and provided with a shoulder to aid in turning over the block as it leaves the mold, substantially as described.

12. In a press, a support for the mold, a bottom board to the mold, an L-shaped plate or shelf within the mold, said plate and board having corresponding openings, a lifting-bar for raising the molded block, a finger provided with a shoulder and pivoted to the bar and arranged to enter the openings in said plate and bottom board in turning over the block as it leaves the mold, substantially as described.

13. In a press, a support for a mold, an L-shaped plate fitting in the mold and formed with an opening, a lifting-bar for raising the molded block, a finger pivoted to the bar and entering the opening in the plate and formed with a shoulder bearing against the plate, said finger turning with the plate and block as the block is turned over in leaving the mold, substantially as described.

14. In a press, a support for a mold, a rack-bar for raising the molded block, a finger pivoted to the bar and engaging a part of the molded block and adapted to tilt as the block is turned over in leaving the mold, and a toothed segment engaging the rack-bar to raise and lower the same, substantially as described.

15. A press comprising upright rods, a fixed platen adapted to be held at various positions on the rods, an upper platen slidably mounted on the rods, a plate or frame connecting together and bracing the rods at their upper ends, links pivotally suspended from said plate or frame between the rods, links pivotally connected to the platen and jointed to said suspended links, pitmen pivotally connected with said links where they are joined together, and a rotatable shaft provided with eccentrics to which the inner ends of said pitmen are connected on opposite sides of said shaft, substantially as described.

In testimony whereof I affix my signature in presence of two witnesses.

CHARLES ARTHUR MEYERS.

Witnesses:
 A. A. SLAYBAUGH,
 W. A. BELL.